March 17, 1942.  E. B. THOMPSON  2,276,435
VIBRATORY JACK
Filed Dec. 13, 1940
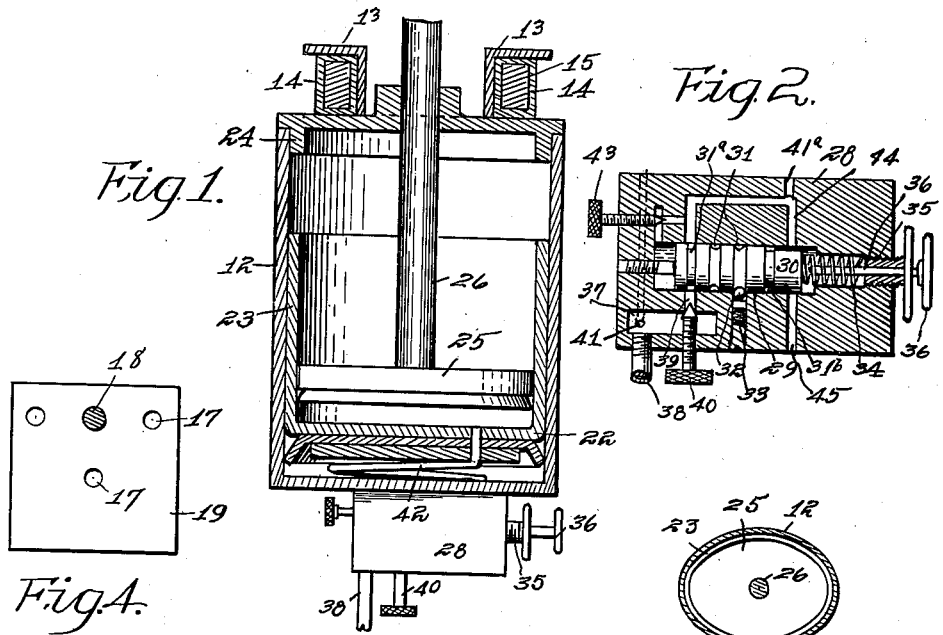
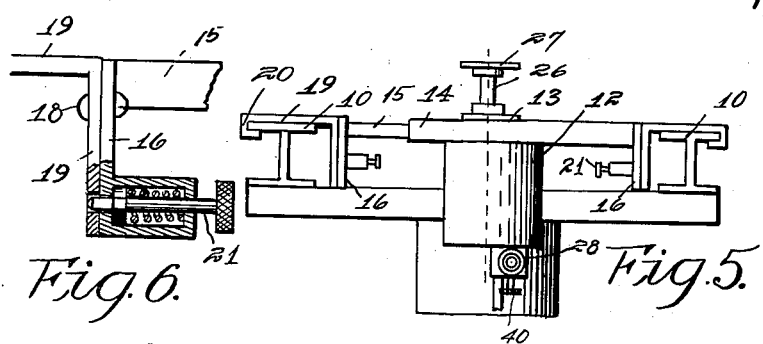
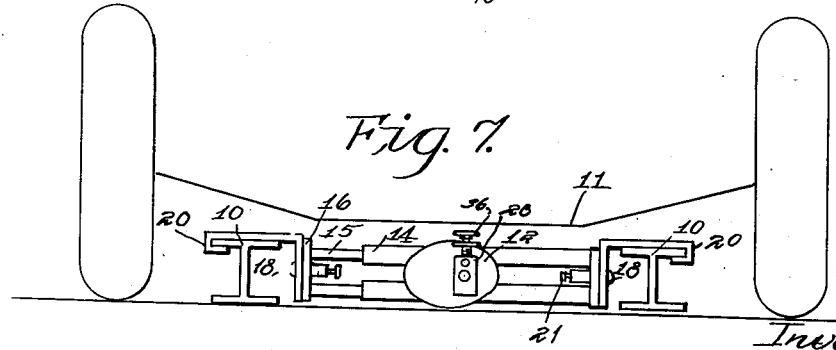
Inventor
Elmer B. Thompson Patented Mar. 17, 1942

2,276,435

UNITED STATES PATENT OFFICE 2,276,435

VIBRATORY JACK

Elmer B. Thompson, Des Moines, Iowa, assignor to Globe Hoist Company, Des Moines, Iowa, a corporation of Iowa Application December 13, 1940, Serial No. 369,943

11 Claims. (Cl. 121—159)

It is the present practice in the servicing of automobiles, particularly the leaf spring lubrication, to elevate the automobile on an automobile hoist and then place a vibratory jack upon the floor and operate it to vibrate the automobile for flexing the leaf springs, to thereby permit ready penetration of a lubricant.

These automobile hoists now in use are of two general types known as the "roll-on" and "free-wheel." The "roll-on" type is characterized by having trough-shaped wheel supports at the top of the hoist piston, and the automobile wheels are driven upon this and supported thereby during the hoisting movement. The free wheel type is characterized by having two parallel rails at the top of the hoist piston to engage the under portions of the automobile axle housings when the hoist is elevated.

The objects of my invention are, first, to provide a vibratory jack of simple and inexpensive construction to be supported upon the wheel troughs or rails of an automobile hoist and not upon the floor, and whereby the vibratory jack may be operated when the automobile hoist is in any position of its movement.

More specifically, it is my object to provide a support for a vibratory jack which may be readily applied to the troughs or rails of an automobile hoist, which support will hold the cylinder member of the vibratory jack in a horizontal position so that it may be easily inserted in position on the automobile hoist when the automobile hoist is in its lowered position, and then readily and easily turned to and supported in upright position when the automobile hoist is elevated and it is desired to vibrate an automobile. Further in this connection, modern automobiles have comparatively little space between the axle housings and the floor on which the automobile is resting, and one of my objects is to provide a pivotally supported cylinder for the vibratory jack having sufficient capacity for vibrating heavy automobiles with the limited amount of air pressure customarily available at automobile servicing stations, and which cylinder, when in horizontal position, will be of such small size as to be capable of insertion under the axle housings of an automobile when the automobile is on an automobile hoist with the hoist in its lowered position.

A further object is to provide an automatic control valve for automobile jacks of this character, which is of simple, durable and inexpensive construction, with few working parts, and capable of being readily and easily adjusted to vary the time between the piston movements and the length of the piston stroke.

Referring to the accompanying drawing—

Figure 1 shows a vertical central sectional view of the cylinder and pistons and supporting frame;

Figure 2 shows an enlarged detail sectional view of the automatic valve;

Figure 3 shows a transverse sectional view of the cylinder;

Figure 4 shows a side view of one of the hanger plates;

Figure 5 shows a side view of my improved jack mounted on the rails of an automobile hoist;

Figure 6 shows an enlarged detail view, partly in section, of the spring bolt assembly for holding the cylinder in its various positions of adjustment; and Figure 7 shows an end view of a part of an automobile positioned above a hoist having my improved jack applied thereto and showing the jack in its horizontal position.

In the drawing, the part of the automobile hoist shown is the H rails 10 of the so-called "free-wheel" hoist. My invention is particularly useful with hoists of this kind because when the hoist is in lowered position there is a relatively small space between the floor level, and the under surfaces of the axle housings of an automobile. In Fig. 7 the automobile axle housing is marked 11.

The cylinder 12 is of oval shape in cross section. At its top is secured two brackets 13, and secured to these brackets are two parallel frame rails 14 of rectangular tube construction. Slidingly mounted in the rails 14 are extension rails 15. At each outer end of the rails 14 and 15 there is fixed a supporting plate 16. At the center of the plate 16 is a pivot 18 connecting it to a hanger plate 19 which is preferably formed with a hook 20 to engage the rails of an automobile hoist, as shown in Figure 5. This plate 19 has three openings 17 formed therein.

When the hoist is in its lowered position and an automobile is standing on the floor above the hoist, as shown in Fig. 7, the operator places the cylinder in horizontal position and moves the jack under the automobile to the desired position under the axle housings.

Fixed to the plate 16 is a spring bolt 21, of ordinary construction, positioned to enter any of the three openings 17 in the hanger plate and to thereby hold the cylinder in either its two horizontal or its upright positions. The telescopic construction of the bars 14 and 15 permits the operator to apply the hanger hooks to hoist rails having any ordinary spaced relationship.

Within the cylinder 12 is a second cylinder 22 open at its upper end and closed at its lower end, and longitudinally movable in the cylinder 12. It is shorter than cylinder 12 and when at its upper limit of movement it will engage the cylinder head 24 which stops its further movement. On the lower end of the cylinder 22 is a piston 23. On the interior of the cylinder 22 is a piston 25 having a piston rod 26 extended through the cylinder head 24. Means hereinafter described are provided for admitting and exhausting air from the spaces below both pistons. This construction of the cylinders and pistons has several advantages. The cylinder 12 is provided with the usual cylinder head 24 and this head forms the necessary limiting stop for the cylinder 22, thereby forming a cheap and durable construction. In the event that there should be a leakage of air around the piston 23, this cannot raise the piston 25, because it will be conducted past the piston 25 by the cylinder 22. The flexible hose 42, hereinafter described, provides for the inlet and exhaust of air between the piston 25 and the cylinder 22, hence, the operation of the piston 25 is entirely independent of the operation of the piston 23.

Secured to the bottom of the cylinder is a valve housing 28 having a cylindrical valve opening 29 in which is slidingly mounted a valve 30 having near its central portion two grooves 31, and two air passageway grooves 31a and 31b.

Mounted in the valve casing is a ball 32 held by a spring 33 against the valve, to force the ball into the grooves 31 and yieldingly hold the valve in either one of two positions. At one end of the valve housing is a spring 34 engaging the adjacent end of the valve and having an adjusting screw 35 for regulating its tension. A screw 36 is extended through the adjusting screw to engage the end of the valve.

In some instances it is desirable to use my jack as an ordinary jack without vibration. With my improved structure this result is very easily attained by simply operating the screw 36 to move the valve 30 to position for closing the air passageways which function to vibrate the valve, and no additional mechanism other than said screw is necessary to accomplish this desirable result.

An air chamber 37 is formed in the valve housing, and an air inlet pipe 38 leads to it. A passageway 39 leads from this chamber to the valve chamber at one end of the valve, and this passageway is controlled by a valve 40.

From the top side of the chamber 37 is a passageway 41 leading into the cylinder 12 below the lower piston. When air under pressure is admitted to the chamber 37, it will flow through the passageway and raise the lower and upper pistons. This is desirable in bringing the cap 27 into contact with the automobile to be serviced.

For vibrating the upper piston I have provided a passageway 41a leading from the chamber 29 to a flexible hose 42 which extends through the lower piston to the space below the upper piston. In this passageway there is a manually operated valve 43 for controlling the rate of pressure variation in said chamber to thereby control the rate of vibration of the jack device. A passageway 44 leads from the passageway 41a to the end of the chamber 29 adjacent the spring 34, and an exhaust passageway 45 leads from a point in the chamber 29 below the passageway 44 to a point of discharge. When the valve 30 is in the position in which it is normally held by the spring 34, the passageways 39, 31a and 41a are in communication, and the exhaust passageway from the valve chamber is closed by the valve, as shown in Fig. 2, and when the valve is in its other position, the exhaust passageway 31b is open and the intake passageway 31a is closed.

The operation of this automatic vibrator of the upper piston is as follows: When the operator opens the valve 40, air under pressure flows to the space below the upper piston, through the adjacent passageway 31a, and its first effect will be to raise the upper piston. Shortly thereafter a sufficient pressure will be built up within the chamber 29 to overcome the force of the spring 34 and the friction of the spring-actuated ball 32 to force the valve 30 to its other limit of movement. This will cut off the air pressure and open the exhaust so that after the pressure is thereby reduced, the spring 34 will return the valve 30 to its first position.

In practice, and assuming that the automobile to be serviced is positioned over a hydraulic automobile hoist when in its lowered position, the operator places the piston of the vibratory jack in horizontal position and inserts it in position under the automobile with the hanger plates engaging and resting upon the wheel troughs or rails of the automobile hoist at the point where it is desired to apply the vibratory movement. By having the cylinder of oval shape, wide laterally and narrow vertically, I have demonstrated that the cylinder may be inserted under the automobile axle housings of automobiles which do not have sufficient road clearance to permit such insertion if the cylinders were round and of sufficient capacity for the service required. In this connection it should be explained that the ordinary automobile servicing stations are now provided with compressed air devices for tire inflation purposes, and supply air pressure of from 150 to 175 lbs. per square inch. I have demonstrated that with a round cylinder of sufficient automobile raising capacity, said available air pressure would be insufficient for raising the heavier automobiles. However, I have demonstrated that with my cylinder structure the heavier automobiles are vibrated and the vibratory jack can be placed in the desired position relative to the automobile hoist and automobile when they are in lowered position. The spring latch applied to the jack frame end plates and engaging the hanger plate, securely holds the cylinder in either its horizontal or its vertical position, and it may be easily moved to either of such positions.

The telescopic jack frame provides for longitudinal adjustment for adapting the frame to fit automobile hoists of various dimensions.

The vibratory control valve is of extremely simple and inexpensive construction and of few parts which are durable and not likely to become misplaced or inoperative. Furthermore, the operator may readily and easily adjust the valve to vary the time between piston strokes to the desired amount, and may also readily and easily adjust the length of the piston stroke.

I claim as my invention:

1. In a vibratory jack, the combination of a cylinder, two pistons in the cylinder, a valve casing associated with the cylinder and having means for conducting fluid pressure to the space between the cylinders and means for exhausting said pressure, a valve slidingly mounted in the valve casing, a spring for yieldingly holding it at one limit of its movement, said valve being formed with passageways for conducting fluid pressure to the space between the pistons, said valve casing being formed with a restricted passageway leading from the source of fluid pressure to the end of the valve, whereby when the pressure has attained a certain degree it will force the valve in the direction opposite to that in which it is forced by the spring and thereby move the valve to position for permitting the fluid pressure to exhaust, and whereby upon the release of of said pressure, the spring will return the valve to said original position.

2. In a vibratory jack, the combination of a cylinder, two pistons in the cylinder, a valve casing associated with the cylinder and having means for conducting fluid pressure to the space between the cylinders and means for exhausting said pressure, a valve slidingly mounted in the valve casing, a spring for yieldingly holding it at one limit of its movement, said valve being formed with passageways for conducting fluid pressure to the space between the pistons, said valve casing being formed with a restricted passageway leading from the source of fluid pressure to the end of the valve, whereby when the pressure has attained a certain degree it will force the valve in the direction opposite to that in which it is forced by the spring and thereby move the valve to position for permitting the fluid pressure to exhaust, and whereby upon the release of said pressure, the spring will return the valve to said original position, and a manually controllable valve for regulating the flow through said restricted passageway.

3. In a vibratory jack, the combination of a cylinder, two pistons in the cylinder, a valve casing associated with the cylinder and having means for conducting fluid pressure to the space between the cylinders and means for exhausting said pressure, a valve slidingly mounted in the valve casing, a spring for yieldingly holding it at one limit of its movement, said valve being formed with passageways for conducting fluid pressure to the space between the pistons, said valve casing being formed with a restricted passageway leading from the source of fluid pressure to the end of the valve, whereby when the pressure has attained a certain degree it will force the valve in the direction opposite to that in which it is forced by the spring and thereby move the valve to position for permitting the fluid pressure to exhaust, and whereby upon the release of said pressure, the spring will return the valve to said original position, a spring-actuated friction device in the valve casing in engagement with the valve for holding the valve against movement until either the spring or the fluid pressure is sufficient to overcome the friction.

4. In a vibratory jack, the combination of a cylinder, two pistons in the cylinder, a valve casing associated with the cylinder and having means for conducting fluid pressure to the space between the cylinders and means for exhausting said pressure, a valve slidingly mounted in the valve casing, a spring for yieldingly holding it at one limit of its movement, said valve being formed with passageways for conducting fluid pressure to the space between the pistons, said valve casing being formed with a restricted passageway leading from the source of fluid pressure to the end of the valve, whereby when the pressure has attained a certain degree it will force the valve in the direction opposite to that in which it is forced by the spring and thereby move the valve to position for permitting the fluid pressure to exhaust, and whereby upon the release of said pressure, the spring will return the valve to said original position, said casing being formed with a passageway leading to the space below the lower cylinder for elevating it and holding it elevated during the vibratory movement of the upper piston.

5. In a vibratory jack, the combination of a cylinder, two pistons in the cylinder, a valve casing associated with the cylinder and having means for conducting fluid pressure to the space between the cylinders and means for exhausting said pressure, a valve slidingly mounted in the valve casing, a spring for yieldingly holding it at one limit of its movement, said valve being formed with passageways for conducting fluid pressure to the space between the pistons, said valve casing being formed with a restricted passageway leading from the source of fluid pressure to the end of the valve, whereby when the pressure has attained a certain degree it will force the valve in the direction opposite to that in which it is forced by the spring and thereby move the valve to position for permitting the fluid pressure to exhaust, and whereby upon the release of said pressure, the spring will return the valve to said original position, said casing being formed with a passageway leading to the space below the lower cylinder for elevating it and holding it elevated during the vibratory movement of the upper piston, and a manually operated valve for closing the passageway to the space between the pistons.

6. In a vibratory jack, the combination of a cylinder, two pistons in the cylinder, a valve casing associated with the cylinder and having means for conducting fluid pressure to the space between the cylinders and means for exhausting said pressure, a valve slidingly mounted in the valve casing, a spring for yieldingly holding it at one limit of its movement, said valve being formed with passageways for conducting fluid pressure to the space between the pistons, said valve casing being formed with a restricted passageway leading from the source of fluid pressure to the end of the valve, whereby when the pressure has attained a certain degree it will force the valve in the direction opposite to that in which it is forced by the spring, and thereby move the valve to position for permitting the fluid pressure to exhaust, and whereby upon the release of said pressure, the spring will return the valve to said original position, and manually operable means for holding the valve against movement and in such position that the passageway to the space between the pistons will be open for the admission of air from the supply pipe.

7. In a vibratory jack, the combination of a cylinder, two pistons in the cylinder, a valve casing associated with the cylinder and having means for conducting fluid pressure to the space between the cylinders and means for exhausting said pressure, a valve slidingly mounted in the valve casing, a spring for yieldingly holding it at one limit of its movement, said valve being formed with passageways for conducting fluid pressure to the space between the pistons, said valve casing being formed with a restricted passageway leading from the source of fluid pressure to the end of the valve, whereby when the pressure has attained a certain degree it will force the valve in the direction opposite to that in which it is forced by the spring and thereby move the valve to position for permitting the fluid pressure to exhaust, and whereby upon the release of said pressure, the spring will return the valve to said original position, and adjustable means for limiting the outward movement of the valve to regulate its length of stroke.

8. In a vibratory jack, the combination of a cylinder, a second cylinder within the first cylinder, closed at its lower end and capable of longitudinal movement therein, a piston fixed to the under side of the second cylinder, a piston within the second cylinder and movable therein and having a piston rod connected therewith and extended through the top of the first cylinder, means for admitting and exhausting fluid pressure below the first mentioned piston, and means for admitting and exhausting fluid pressure from below the second piston.

9. In a vibratory jack the combination of a cylinder having a cylinder head at its upper end, a second cylinder within the first cylinder, closed at its lower end and capable of longitudinal movement therein and having its upward movement limited by engagement with said cylinder head, a piston fixed to the under side of the second cylinder, a piston within the second cylinder and movable therein and having a piston rod connected therewith and extended through the top of the first cylinder, means for admitting and exhausting fluid pressure below the first mentioned piston, and means for admitting and exhausting fluid pressure from below the second piston.

10. In a vibratory jack, the combination of a cylinder, a second cylinder within the first cylinder, closed at its lower end and capable of longitudinal movement therein, a piston fixed to the under side of the second cylinder, a piston within the second cylinder and movable therein and having a piston rod connected therewith and extended through the top of the first cylinder, means for admitting and exhausting fluid pressure below the first mentioned piston, and means for admitting and exhausting fluid pressure from below the second piston, comprising a flexible tube having one end communicating with the space between the upper piston and its cylinder and extended through the adjacent end of the main cylinder.

11. In a vibratory jack, the combination of a frame designed to be supported on an automobile jack or the like, a cylinder pivoted to the frame to swing from horizontal to vertical position, a second cylinder within the first cylinder, closed at its lower end and capable of longitudinal movement therein, a piston fixed to the under side of the second cylinder, a piston within the second cylinder and movable therein and having a piston rod connected therewith and extended through the top of the first cylinder, means for admitting and exhausting fluid pressure below the first mentioned piston, and means for admitting and exhausting fluid pressure from below the second piston, said cylinders and pistons being of oval shape and being so supported on the frame that when in horizontal position their smaller dimension will be vertical, to occupy a minimum of space below an automobile on the frame.

ELMER B. THOMPSON.